(12) United States Patent
Braun

(10) Patent No.: US 6,250,649 B1
(45) Date of Patent: Jun. 26, 2001

(54) MULTI-TRACK CURVE TILTING VEHICLE

(75) Inventor: Dieter Braun, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/403,700

(22) PCT Filed: Apr. 9, 1998

(86) PCT No.: PCT/EP98/02103

§ 371 Date: Jan. 12, 2000

§ 102(e) Date: Jan. 12, 2000

(87) PCT Pub. No.: WO98/49023

PCT Pub. Date: Nov. 5, 1998

(30) Foreign Application Priority Data

Apr. 25, 1997 (DE) .............................................. 197 17 418

(51) Int. Cl.[7] .......................... B60G 17/15; B60G 21/10; B60G 21/00

(52) U.S. Cl. ............................... 280/5.506; 280/124.106; 701/38

(58) Field of Search ............................... 180/41; 280/5.5, 280/5.502, 5.504, 5.506, 5.508, 5.509, 6.157, 6.158, 124.103, 124.106, 5.507; 701/38, 37; 105/164

(56) References Cited

U.S. PATENT DOCUMENTS

| | | | | |
|---|---|---|---|---|
| 2,279,120 | * | 4/1942 | Hurley | 280/5.509 |
| 2,788,986 | * | 4/1957 | Kolbe | 280/124.103 |
| 3,008,729 | * | 11/1961 | Muller et al. | 280/5.509 |
| 3,917,295 | * | 11/1975 | Hiruma | 280/5.507 |
| 3,938,823 | * | 2/1976 | Hiruma | 280/6.158 |
| 4,072,325 | * | 2/1978 | Bright et al. | 280/5.5 |
| 4,277,076 | * | 7/1981 | Hanna | 280/5.508 |
| 4,534,575 | * | 8/1985 | Grove et al. | . |
| 4,546,997 | * | 10/1985 | Smyers | 280/5.506 |
| 4,573,702 | * | 3/1986 | Klem | 280/5.506 |
| 5,116,069 | * | 5/1992 | Miller | . |
| 5,255,611 | * | 10/1993 | Schneider | . |
| 5,580,089 | * | 12/1996 | Kolka | 280/5.508 |
| 5,609,352 | * | 3/1997 | DiMaria | . |
| 5,927,424 | * | 7/1999 | Van Den Brink et al. | . |

\* cited by examiner

Primary Examiner—Paul N. Dickson
Assistant Examiner—Bryan Fischmann
(74) Attorney, Agent, or Firm—Crowell & Moring, L.L.P.

(57) ABSTRACT

A tilting-body vehicle, in which the control system for the body tilt comprises an emergency system. In the event of a failure of a normally effective main system, the emergency system permits an emergency operation at least for a limited time. Three body positions are made possible depending on the transverse acceleration of the vehicle: namely, maximum tilt to the left, upright position and maximum tilt to the right. The emergency system is controlled via an inertia mass.

8 Claims, 1 Drawing Sheet

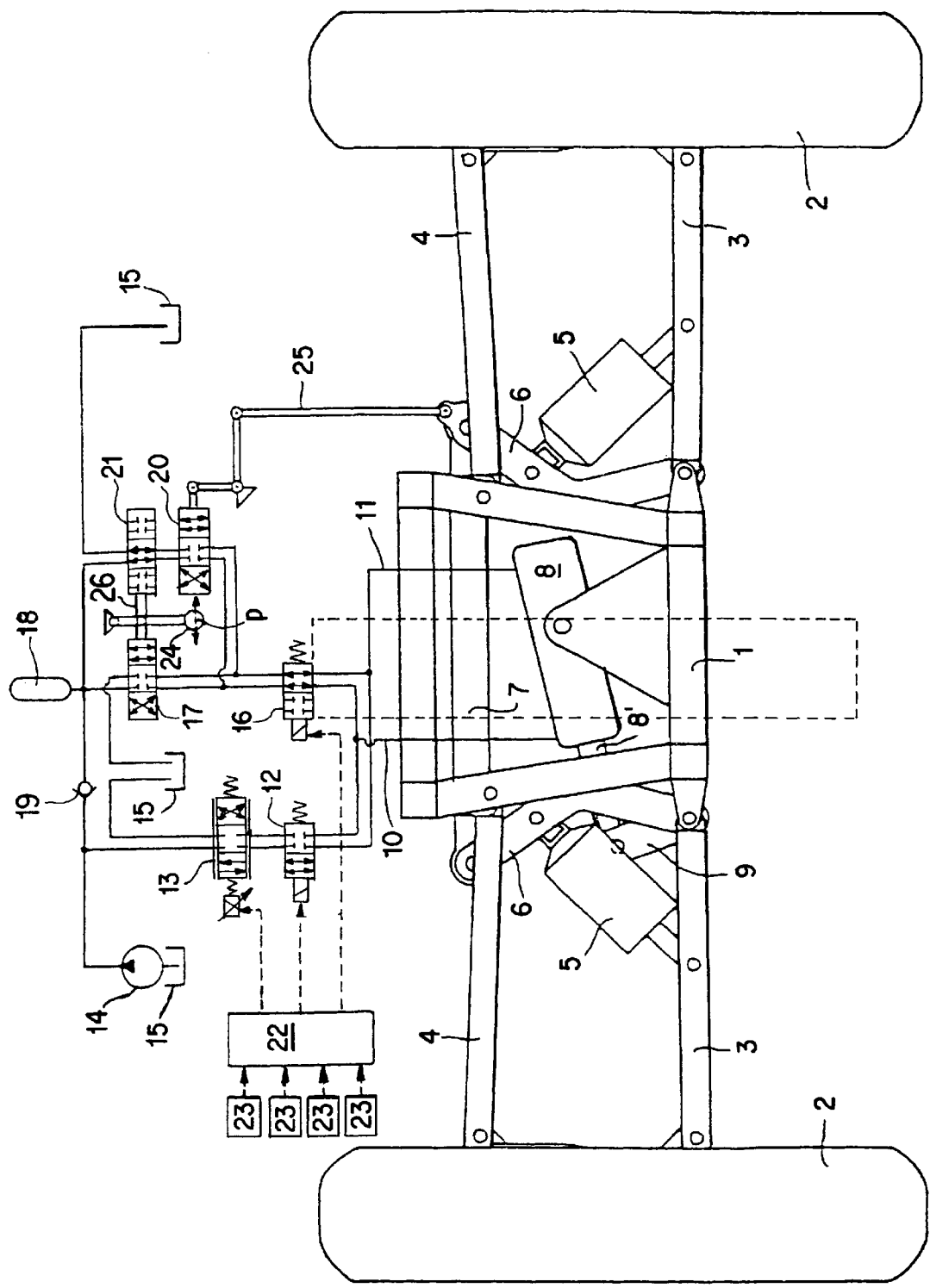

MULTI-TRACK CURVE TILTING VEHICLE

BACKGROUND OF THE INVENTION

The application claims priority of DE 197 17 418.3 filed Apr. 25, 1999, now German Patent DE 197 17 418, patented Oct. 22, 1998; the disclosure of which is expressly incorporated by reference herein.

The present invention relates to a multi-track tilting-body vehicle, the body of which, when travelling on curves, can be tilted in an active manner to the inside of the curve by an actuator operated by an automatic control system, in particular a three-wheel vehicle having two front wheels—preferably following the body tilt—and a rear wheel following the body tilt.

Such vehicles are known in principle. For example, railway carriages whose body, when travelling on curves, tilts towards the inside of the curve in order to compensate for the centrifugal forces acting on the passengers are already in regular use. In this way, passenger comfort can be substantially increased. Reference may be made in this connection to EP 0 528 783 A1.

In vehicles having a small gauge track compared with the vehicle size, the tilting of the body on curves as well as a wheel slanting position, controlled in accordance with the body tilt, also serve to ensure the requisite side-tilt stability of the vehicle at higher speeds on curves. Such vehicles are described, for example, in non-published DE 196 08 578 A1.

SUMMARY OF THE INVENTION

An object of the present invention, then, is to ensure a high degree of safety even if a malfunction occurs in the automatic control of the tilting on curves.

To this end, provision is made according to the invention that the control system, which continuously checks for correct operational function, is automatically cut off/disconnected from the actuator in the event of a malfunction, if the control system is disconnected from the actuator, a continuously working emergency system, which, however, is disconnected from the actuator during normal operation, is connected to the actuator, this emergency system has an inertia mass which reacts to transverse accelerations of the vehicle and assumes a center position when transverse accelerations disappear, in each case one of two parallel control devices of the emergency system is rendered effective by this inertia mass in such a way that the first control device comes into effect when transverse accelerations are significant and the second control device comes into effect when transverse accelerations disappear, and the first control device produces a maximum body tilt in the direction of the transverse acceleration and the second control device retracts the body tilt when the emergency system is connected to the actuator.

The invention is based on the general recognition of providing an emergency control system with its own energy supply in case of an emergency, so that at least some driving maneuvres with tilting of the body on curves can still be carried out or continued before the vehicle can continue to travel, in particular in curves, if need be with the body fixed in an upright position and at reduced travelling speed. In this way, even the worst conceivable emergency, i.e. starting to travel on a curve at high speed, can be coped with, since the body can still be tilted by the emergency control system.

Furthermore, the concept of using especially reliable mechanical elements, i.e., an inertia mass or an inertia pendulum, for the emergency control is realized by the invention. The control members actuated by these elements are rendered ineffective during normal operation but work continuously in the same way as in an emergency. The reliability is further increased owing to the fact that parallel control circuits with, in each case, functionally separate tasks are provided.

At the same time, the system according to the invention is distinguished by desirable simplicity by virtue of the fact that, in emergencies, when transverse acceleration of the vehicle is significant, in each case the maximum body tilt is set in the direction of the transverse acceleration. As a result, maximum side-tilt stability of the vehicle when travelling on curves is ensured on the one hand, and considerable constructional simplicity and corresponding reliability are ensured on the other hand. Only a loss of comfort for the occupants has to be accepted.

In a currently preferred embodiment of the invention, a double-acting fluidic actuator for setting the body tilt is provided and an accumulator is provided as energy storage device for an emergency. The accumulator is shut off from the actuator during normal operation by a shut-off valve continuously spring-loaded in the opening direction.

The first control circuit, in the case of a fluidic actuator, can have a valve arrangement which is actuated by the inertia mass, is arranged between the accumulator and the actuator. When transverse acceleration is slight or disappears, the valve arrangement disconnects both sides of the actuator from the accumulator and, when transverse acceleration is significant, in each case connects one side of the actuator to the accumulator and the other side of the actuator to a relatively pressureless outlet. In the case of a hydraulic system, this outlet can lead to a relatively pressureless hydraulic reservoir.

The second control circuit can have a shut-off valve controlled by the inertia mass and opened when transverse acceleration disappears and, in series with said shut-off valve, a control valve. The control valve is controlled by the body tilt and, depending on the direction of the body tilt, connects the one or the other side of the actuator to the accumulator and connects the respectively remaining side of the actuator to the relatively pressureless outlet in such a way that the body tilt is retracted.

In an especially preferred embodiment of the invention, the inertia mass as well as the control elements or valves actuated by the mass may be arranged on a platform, which is continuously approximately horizontal or is held horizontal, in order to be able to utilize the inertia effects in an especially effective manner.

Other objects, advantages and novel features of the present invention will become apparent from the following detailed description of the invention when considered in conjunction with the accompanying drawings.

DESCRIPTION OF THE DRAWING

The single FIGURE, is a schematic cross section of the tilting-body vehicle according to the invention in the region of the front axle when the controller records a malfunction, and the valves (12 and 16) are shifted.

DETAILED DESCRIPTION OF THE INVENTION

The vehicle has a body (not shown in detail) with a chassis 1, to which front wheels 2, in a manner known in principle, are linked in the front region by bottom and top transverse links 3, 4 in such way as to be vertically movable. The bottom transverse links 3 are resiliently supported via spring and shock-absorber units 5 on chassis-side abutments which are connected in a pivotably mounted manner to the chassis 1 as levers 6 pivotable about longitudinal axes of the vehicle, and are connected to one another in an articulated manner via a connecting rod 7 at their top free ends.

Furthermore, an actuator 8 designed as a double-acting piston/cylinder member is pivotably mounted on the chassis 1. The piston rod 8' of the actuator 8 is connected in an articulated manner to an arm 9 which in turn is fastened in a rotationally locked manner to the left-hand lever 6. By operation of the actuator 8, the levers 6 can thus be pivoted relative to the chassis 1 while the chassis 1 and the front wheels 2 are tilted sideways. The vehicle body (not shown), when travelling on curves, can thus be tilted towards the inside of the curve.

The two sides of the actuator 8 are connected via connecting lines 10, 11 to a shut-off valve 12 which is loaded continuously in the closing direction by a closing spring and is arranged in series with a proportional valve 13 which is connected on the one hand to a pump 14 serving as a hydraulic pressure source, and on the other hand to a relatively pressureless reservoir 15, to which the suction side of the pump 14 is also connected.

Parallel to the shut-off valve 12, the connecting lines 10, 11 of the actuator 8 are connected to a shut-off valve 16 which is continuously pushed or biased into its open position by spring force. Arranged in series with the shut-off valve 16 is a control valve 17 which is connected on the one hand to the reservoir 15 and on the other hand to a hydraulic accumulator 18 which is also connected to the pressure side of the pump 14 via a non-return valve 19.

A control valve 20 and a shut-off valve 21 are connected in series and are arranged parallel to the control valve 17. The shut-off valve 21 is connected on the one hand to the accumulator 18 and on the other hand to the reservoir 15.

An electronic controller 22 serving to control the body tilt of the vehicle is connected on the input side to various sensors 23, so that parameters which are predetermined can be taken into account during the control of the body tilt. On the output side, the controller 22 is connected to the operating magnets of the proportional valve 13 and of the shut-off valves 12, 16. During normal function of the controller 22, the shut-off valve 12 is kept open against the force of its closing spring, and the shut-off valve 16 is held closed against the force of its opening spring.

The control valve 17 and the shut-off valve 21 are controlled by an inertia pendulum 24 which reacts to transverse accelerations of the vehicle. Depending on the direction of the transverse acceleration, the pendulum 24 is deflected in one direction of the double arrow P. In a currently preferred embodiment of the invention, the inertia pendulum 24 is provided with a centering spring (not shown) which attempts to push the pendulum 24 into the neutral position shown, so that the inertia pendulum 24 cannot be deflected until there is a minimum degree of transverse acceleration.

In the neutral position of the inertia pendulum 24, the control valve 17 assumes a closed position and the shut-off valve 21 is open. Upon deflection of the inertia pendulum 24, the shut-off valve 21 is closed, while the control valve 17, depending on the direction of the deflection, assumes one of the two operating positions shown.

The control valve 20 is controlled as a function of the body tilt of the vehicle and to this end, in the embodiment shown, is coupled via a linkage 25 to the right-hand lever 6. When the vehicle body assumes its normal upright position, the control valve 20 is closed. If the vehicle body is tilted sideways towards the one side or the other, the control valve 20 is put into one of the other two further operating positions shown.

The controller 22 continuously checks for operation faults of any kind. As long as no fault of any kind is detected, the operating magnets of the shut-off valves 12, 16 are energized, with the result that the shut-off valve 12 assumes its open position and the shut-off valve 16 assumes its closed position. As a function of the signals from the sensors 23, the controller 22 actuates the proportional valve 13, whereby the two sides of the actuator 8 are either disconnected from one another or are connected with controllable throttling to the pressure side of the pump 14 and respectively to the relatively pressureless reservoir 15. The piston rod 8' of the actuator 8 is displaced in one or other direction while the vehicle body is pivoted sideways. In effect, in this manner, in the normal case, the tilting of the vehicle body on curves is controlled in such a way that the centrifugal forces acting on the occupants when travelling on curves is compensated for by slanting of the body.

During this normal operation, the accumulator 18 is continuously charged or kept at operating pressure. Discharge of the accumulator 18 is not possible during normal operation on account of the non-return valve 19 and the shut-off valve 16 which is closed during normal operation.

During normal operation, transverse accelerations of the vehicle, in particular as a result of travelling on curves, lead to the deflection of the inertia pendulum 24, so that the valves 17, 21 coupled to the inertia pendulum 24 are correspondingly adjusted. In addition, the control valve 20 is also adjusted as a function of the body tilt. During normal operation, however, these adjustments of the valves 17, 20 and 21 remain ineffective on account of the shut-off valve 16 which is closed in this case.

As soon as the controller 22 records a malfunction, the operating magnets of all valves controlled by it on the output side are de-energized. Thus, the shut-off valve 12 shifts into the closed position shown and the shut-off valve 16 shifts into the open position shown in the single drawing figure. In addition, the proportional valve 13 can be pushed into its closed position by springs.

An emergency control of the body tilt by the valves 17, 21 actuated by the inertia pendulum 24 as well as the valve 20 controlled by the body tilt now comes into effect.

If the vehicle is steered into a curve or travels round a curve, the inertia pendulum 24 pivots towards the outside of the curve, with the result that the valve 21 opened previously is closed and thus the control valve 20 is rendered ineffective. At the same time, the control valve 17 is changed over from the closed position shown into one of the two operating positions in such a way that in each case one side of the actuator 8 is connected to the accumulator 18 and the other side of the actuator 8 is connected to the reservoir 15. In effect, the body of the vehicle tilts towards the respective inside of the curve, specifically in each case with maximum sideways tilt.

As soon as no transverse acceleration or only a very slight transverse acceleration (i.e., negligible transverse acceleration) acts on the vehicle, for instance after completion of travel on a curve, the inertia pendulum 24 moves back into the neutral position shown. As a result the control valve 17 closes and the shut-off valve 21 is opened. Thus, the control valve 20 controlled by the body tilt comes into effect and assumes one of its operating positions on account of the body tilt which is still present. In this case, the control valve 20 is designed in such a way that the two sides of the actuator 8 are now connected to the accumulator 18 and the reservoir 15 in such a way that the existing sideways tilt of the body is retracted. As soon as the body of the vehicle is upright again, the control valve 20 closes.

In this way, an emergency operation for the control of the body tilt is made possible, in which case three positions can be set:

The body is tilted to a maximum extent to the left, the body is righted and the body is tilted to the maximum extent to the right.

If the pump 14 continues to run during the emergency operation, the emergency operation may be maintained virtually as long as desired. Otherwise, the emergency operation is possible at least until the discharge of the accumulator 18. The accumulator 18 is dimensioned in such a way that a double track change, during which the body is tilted first of all to one vehicle side and then to the other vehicle side and then back into the upright position, is possible. In this way, driving maneuvres which have started may also be completed at a high travel speed. The vehicle body may then be secured in the upright position with a locking device (not shown), so that further travel of the vehicle at reduced speed without any body tilt when travelling on curves is still possible.

The inertia pendulum 24 together with the valves 17, 21 controlled by it is preferably arranged on a platform 26 (only schematically indicated), which stays horizontal or is held in the horizontal position (i.e. approximately parallel to the roadway plane) irrespective of the sideways tilt of the vehicle body. This measure achieves a situation in which the inertia forces acting in the transverse direction of the vehicle can control the inertia pendulum 24 in an especially effective manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything which the scope of the appended claims and equivalents thereof.

What is claimed is:

1. A multi-track tilting-body vehicle having a body which, when travelling on curves, is tiltable to an inside of a curve, comprising an actuator (8) for effecting the tilt, an automatic control system (22), for operating the actuator (8) to cause selected wheels to follow the body tilt, the automatic control system (22) being configured to continuously check for correct operation, to be automatically disconnected from the actuator (8) in the event of a malfunction so that a continuously working emergency system, which is cut off from the actuator (8) during normal operation, is connected to the actuator (8), wherein the emergency system has an inertia mass (24) arranged to react to transverse accelerations of the vehicle and to assume a center position when the transverse accelerations disappear, and two parallel control devices (17, 20), a first of the control devices which is actuated by the inertia mass (24) such that the first of the control devices (17) comes into effect when predetermined transverse accelerations occur and a second of the control devices (20) comes into effect when the transverse accelerations disappear, the first of the control devices (17) producing a maximum body tilt in a direction of the transverse acceleration and the second of the control devices (20) retracting the body tilt when the emergency system is connected to the actuator (8).

2. The vehicle according to claim 1, wherein the actuator (8) comprises a double-acting fluidic actuator and an accumulator (18) is operatively connected with the actuator (8) such that the accumulator (18) which comprises an energy storage device is shut off from the actuator (8) during normal operation by a shut-off valve (12) continuously spring-loaded in an open position thereof.

3. The according to claim 2, wherein the actuator (8) is hydraulic.

4. The vehicle according to claim 2, wherein the first of the control devices comprises circuit has a valve arrangement (17) actuatable by the inertia mass (24), arranged between the accumulator (18), and the actuator (8), and, when the transverse acceleration is negligible, shuts off both sides of the actuator (8) and, when the predetermined transverse acceleration occurs, connects one side of the actuator (8) to the accumulator (18) and another side of the actuator (8) to a relatively pressureless outlet (15) such that the body is tilted to a maximum extent in the direction of the transverse acceleration.

5. The vehicle according to claim 2, wherein the second of the control devices comprises has a shut-off valve (21) controllable by the inertia mass (24) and opened when the transverse acceleration disappears, and, in series with said shut-off valve (21), a control valve (20), controllable by the body tilt and, depending on the direction of the body tilt, connecting the one or the other side of the actuator (8) to the accumulator (18) and connecting a respectively remaining side of the actuator (18) to a relatively pressureless outlet (15) such that a body tilt is retracted.

6. The vehicle according to one of claim 1, wherein the inertia mass (24) and the control devices (17, 21) actuated thereby are arranged on a platform (26) which is continuously approximately horizontal or is held horizontal.

7. The vehicle according to claim 2, wherein an autonomously powered pressure source (14) is provided in addition to or in place of the accumulator (18).

8. The vehicle according to claim 1, wherein an energy storage device (18) which is configured to be continuously recharged during normal operation is operatively associated with the emergency system.

* * * * *